Dec. 22, 1970 S. R. OLECK 3,548,529

TELEPHONE INDEX

Filed July 25, 1968 3 Sheets-Sheet 1

INVENTOR.
SEYMOUR ROBERT OLECK

BY

OSTROLENK, FABER, GERB & SOFFEN

ATTORNEYS

Dec. 22, 1970 S. R. OLECK 3,548,529

TELEPHONE INDEX

Filed July 25, 1968 3 Sheets-Sheet 2

Dec. 22, 1970 S. R. OLECK 3,548,529

TELEPHONE INDEX

Filed July 25, 1968 3 Sheets-Sheet 3

INVENTOR.

SEYMOUR ROBERT OLECK

BY

OSTROLENK, FABER, GERB & SOFFEN

ATTORNEYS 3,548,529
TELEPHONE INDEX
Seymour Robert Oleck, 132 Chalford Lane,
Scarsdale, N.Y. 10583
Filed July 25, 1968, Ser. No. 747,630
Int. Cl. G09f 3/20
U.S. Cl. 40—336 8 Claims

ABSTRACT OF THE DISCLOSURE

An indexed telephone directory is provided for attachment to the handset of a telephone. The directory includes a plastic frame secured to the cushioned legs of the telephone handset and a sliding train mounted to the frame for movement between positions wherein the tray is hidden beneath the telephone and wherein the tray is withdrawn from beneath the telephone, A pair of prongs on the tray are employed for the purpose of mounting the tray to the frame and at the same time securing a plurality of index cards of varying sizes to the tray.

This invention relates to indexed telephone number directories and is more specifically concerned with a directory readily attachable to the underside of a telephone handset and movable from a position beneath the handset to a position exposing the telephone number listing index.

Telephone directories of the type suitable for attachment to the telephone handset has been found to be of great utility to a great variety of telephone users. Such directories are particularly useful for the storage of frequently called numbers and emergency telephone numbers when used in conjunction with home or office phones and they are of particular use on motel and hotel phones for direct dialing instructions for guests such as hotel front desk, valet, room service, wake up calls, long distance operator, et cetera, advertisements and other frequently used numbers such as restaurants, travel service, theaters, et cetera.

Since telephone handsets are generally leased from the telephone company, it is necessary to comply with the telephone company regulations regarding the attachment of foreign devices to the telephone handset. Hence, the attachment of the telephone directory must be in such a manner as to be removable without damage to the telephone and as not to interfere with the operation of the telephone. Previous telephone directories suitable for such attachment to the telephone handset and over which the present invention is an improvement are shown in U.S. Pat. No. 2,741,860 issued Apr. 17, 1956 and entitled "Telephone Index," and U.S. Pat. No. 2,990,639 issued July 4, 1961 and entitled "Telephone Number Index," both granted to David W. Van Gieson.

The previous telephone directories of the type suitable for attachment to telephone handsets have had numerous drawbacks. These directories have had severe problems regarding their lack of durability due to such things as the mutilation of their index cards, the wearing away of elastic cords for mounting the directory due to the rubbing of the cord by the cards and the rubbing of the directory against the telephone.

In one preferred embodiment of the instant invention an indexed telephone directory for attachment to the handset of the telephone is provided having a frame member attachable to the cushioned legs of the telephone handset and having a tray slidably supported by the frame member for movement between the legs of the telehone handset between positions wherein the tray is substantially hidden beneath the telephone handset and wherein the tray is withdrawn from beneath the telephone handset. The tray includes a pair of prongs for securing a plurality of varying sized index cards thereto and for insertion within a longitudinal slot in the frame member whereby the tray is slidably fastened to the frame member. The frame member includes a pair of indentations positioned for securement to two legs of the telephone handset and an elastic cord for securing the frame members to the other two legs of the telephone instrument. The tray further includes a plurality of protrusions parallel to the longitudinal slot for insuring a minimum separation between the telephone handset and the frame member so that the prongs do not rub against the bottom of the telephone handset upon the sliding of the tray. A curved lip is provided at the end of the frame member through which the tray moves in and out to prevent the index cards from engaging the telephone instrument and thereby becoming caught and damaged. The frame member is also provided with guide means to prevent the various sized index cards from rotating off the tray and thereby causing the jamming of the tray and damage to the cards.

Another alternative embodiment of the present invention is comprised of providing a pair of flexible springy leaf members having central openings for force fitting upon the back legs of the telephone handset and further provided with a tangential opening for threading of the elastic cord to provide good mechanical clamping to the rear legs. As a further alternative embodiment, the frame member may be provided with a pair of openings at its rearward end which are comprised of the springy flexible leafs of plastic having central openings for force fitting upon the rear legs, thereby eliminating the requirement for an elastic band.

It is therefore one object of the instant invention to provide a new and novel indexed telephone directory of the type suitable for attachment to the telephone handset.

It is a further object of the instant invention to provide such directory with means for assuring its freedom from interference with the telephone instrument.

It is yet another object of the instant invention to provide such telephone directory with means for insuring its freedom from jamming and mutilation of the index cards of the directory.

Another object of the instant invention is to provide an indexed telephone directory suitable for attachment to a telephone whereby the index cards of the directory may be of varying sizes to facilitate the indexing and to make the directory more suitable for advertisements.

In a second embodiment of the instant invention, the elastic cord is eliminated and a second pair of indentations is provided for cooperation with the second pair of legs of the telephone handset to secure the frame member to the telephone handset.

The above objects, features and advantages of the instant invention, along with other objects, features and advantages will become apparent upon a reading of the following description of the preferred embodiment thereof in conjunction with the drawings as follows:

FIG. 1 is a perspective view of a preferred embodiment of the indexed telephone directory of the instant invention with the tray partially withdrawn from the frame member.

FIG. 1*a* is a perspective view of a portion of the frame member for permitting cooperative sliding with the tray.

Figures 1, 1A, 2:
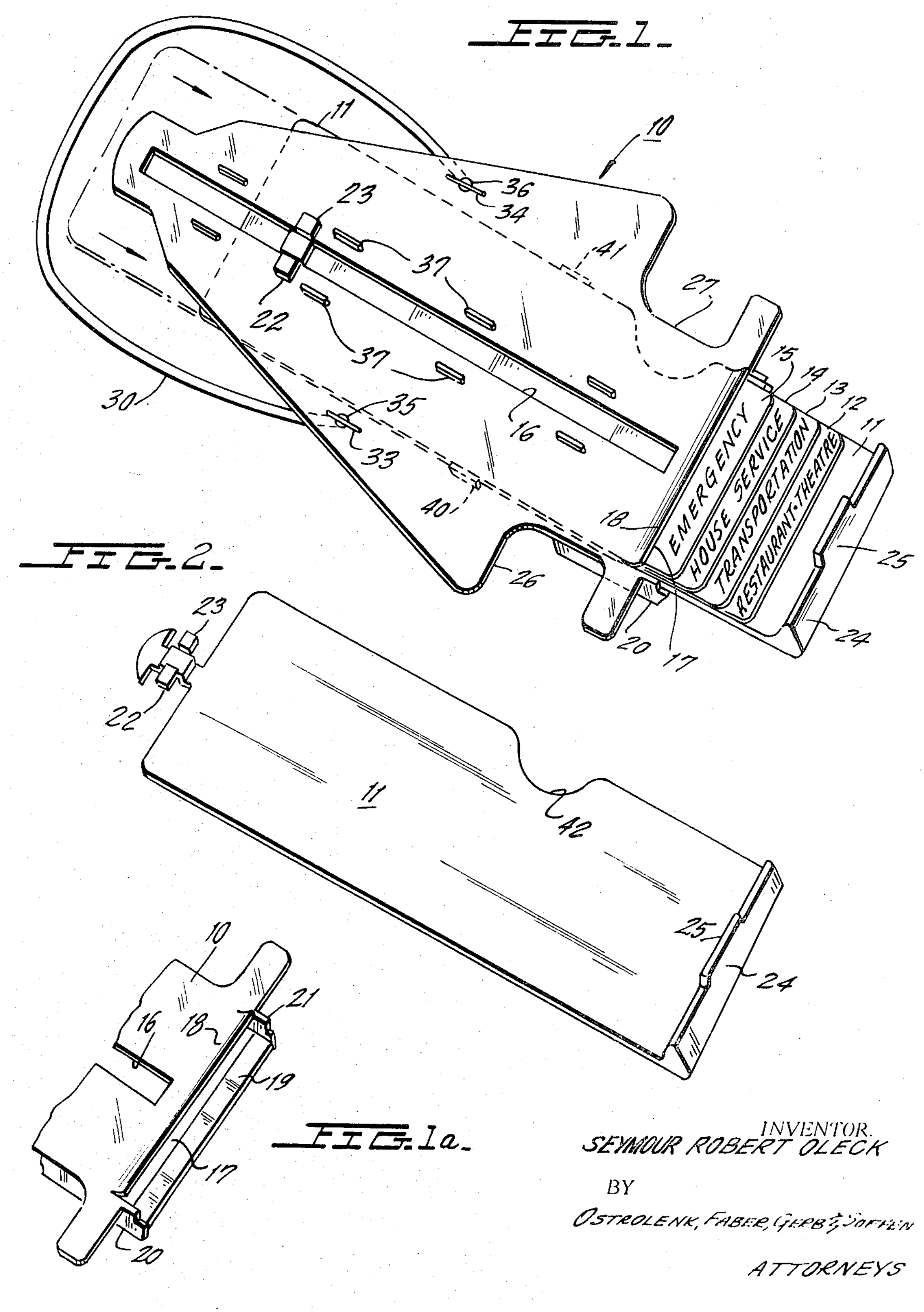
FIG. 2 is a perspective view of the tray of the indexed telephone directory of the instant invention.

Referring first to FIG. 1, there is shown a perspective view of the indexed telephone directory of the instant invention. The directory consists of a frame member 10 having a sliding tray 11 attached thereto. The frame tray 11 carries index cards such as 12, 13, 14, and 15.

The frame member 10 has an elongated longitudinal slot 16 extending for a substantial length of the frame member. The frame member also includes a transverse slot 17 extending across the front end of the frame member 10. The slot is formed by the upwardly curved lip 18, the bridge 19 and a pair of legs 20 and 21 shown more clearly in FIG. 1*a*. The slots 16 and 17 are provided to cooperate with the tray 11 so as to enable the sliding of the tray. More specifically, the tray 11 fits within the slot 17 provided in the front end of the frame 10 and it has a pair of prongs 22 and 23 which fit within the slot 16 and overlap the edges of the slot so that the tray is loosely held to the frame. The tray 10 should be made of plastic or other suitable materials so that the edges of the slot 16 may easily be spread apart by flexing for the reception of the prongs 22 and 23 of the tray 11. Shoulder 24 and tab 25 are provided on tray 11 to act as a stop so that tray 11 may not be pushed into slot 17 beyond its edge and to also act as means for pulling the tray 11 from beneath the frame 10.

Figure 4:
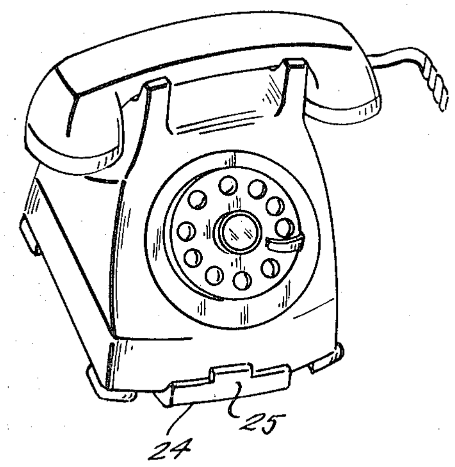
FIG. 4 is a perspective view of a telephone handset having the indexed telephone directory of the instant invention attached thereto.
Figures 5, 6:
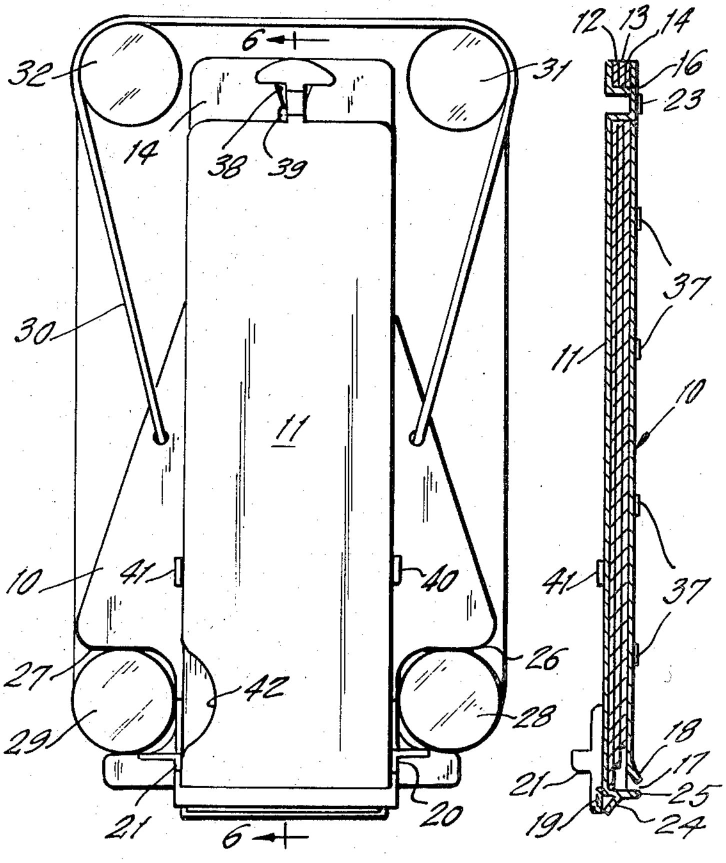
FIG. 5 is a plan view of the underside of the telephone handset of FIG. 4 showing the indexed telephone directory attached thereto.
FIG. 6 is a cross-sectional view of the indexed telephone directory taken along lines 6—6 of FIG. 5.

The frame 10 is additionally provided with a pair of recesses or indentations 26 and 27 which are spaced and shaped so as to fit around the front cushioned legs of a telephone handset such as shown in FIG. 5 as 28 and 29. Elastic cord 30 is provided to fit around the remaining two legs 31 and 32 of the telephone handset. The elastic cord 30 is provided of a length sufficient to be stretched around the legs 31 and 32 and yet short enough so as to provide enough tension whereby the telephone directory is secured to the bottom of the telephone handset as shown in FIG. 4. The elastic cord 30 is held to the frame member 10 by means of metal tips 33 and 34 which are provided on the ends of the elastic cord 30 and which are inserted in holes 35 and 36 of frame member 10. When the elastic cord 30 is stretched, the metal tips 33 and 34 bridge the holes 35 and 36 to hold the cord 30 to the frame member 10.

The tray 10 is additionally provided with a plurality of protrusions 37 which are of a height greater than the thickness of the prongs 22 and 23. These protrusions serve to prevent the prongs 22 and 23 from coming in contact with the underside of the telephone handset when the tray 11 is moved.

Figure 3:
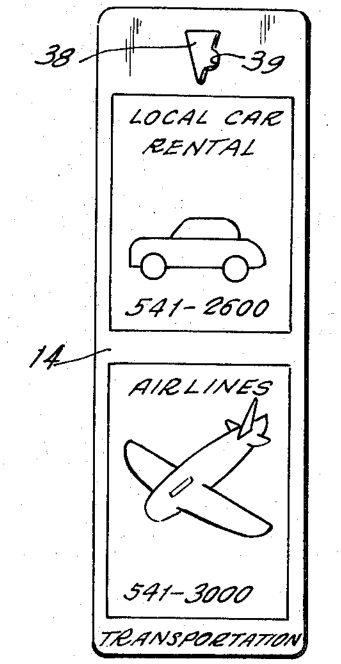
FIG. 3 is a plane view of a typical index card to be employed in the indexed telephone directory of the instant invention.

Index cards such as 12, 13, 14, and 15 are provided to rest within tray 11. These index cards may be of varying sizes such as shown in FIG. 1, whereby they may be made to overlap with a legend for each card being visible. Hence the cards may be used as a display for advertisements such as shown in FIG. 3. Of course, the cards may also include an alphabetical index and ruled lines whereby frequently called numbers may be recorded. The cards are each provided with apertures 38 whereby the cards may be secured to the tray 11 to prevent their longitudinal displacement upon the sliding of the tray. The apertures 38 are suitably shaped having a generally triangular configuration with a semicircular cutout 39 whereby the cards may be placed over the prongs 22 and 23 and rotated into position. The frame member 10 is provided with projections 40 and 41 on its undersurface which serve as a guide for the tray 11 and the index cards.

The guides 40 and 41 prevent the rotation of the index cards about the prongs 22 and 23 when the tray has been secured to the frame member 10 and thereby prevent the jamming of the tray and mutilation of the cards which would result from such rotation. Furthermore, the upwardly curved lip 18 prevents the index card from getting caught by the front edges of the frame member 10 or by the underside of the telephone handset. The tray 11 is also provided with the recessed portion 42 whereby the cards may be easily lifted.

Figure 7:
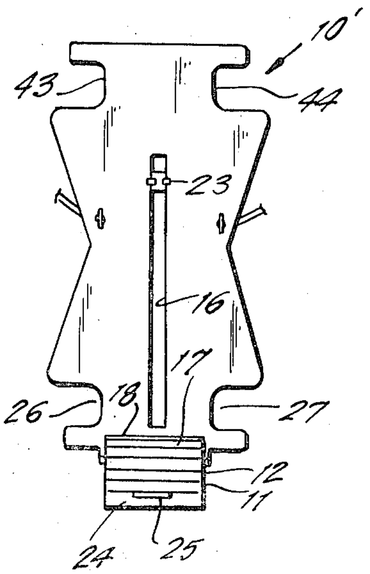
FIG. 7 is a perspective view of a second preferred embodiment of the instant invention.

Referring next to FIG. 7, there is shown a second embodiment of the instant invention. In view of the obvious similarity of the embodiment of FIG. 7 to that of FIG. 1, only the changes incorporated in FIG. 7 will be described. In particular, the embodiment of FIG. 1 has eliminated the elastic cord 30 of FIG. 1 and has replaced this cord by the modification of the frame member 10′ to include a second pair of indentations 43 and 44. The second pair of indentations are provided suitably positioned from the first pair 26 and 27 so that the indentations cooperate with the four legs of a telephone handset to secure the frame member and hence the telephone directory to the underside of the telephone handset.

Figures 8, 9:
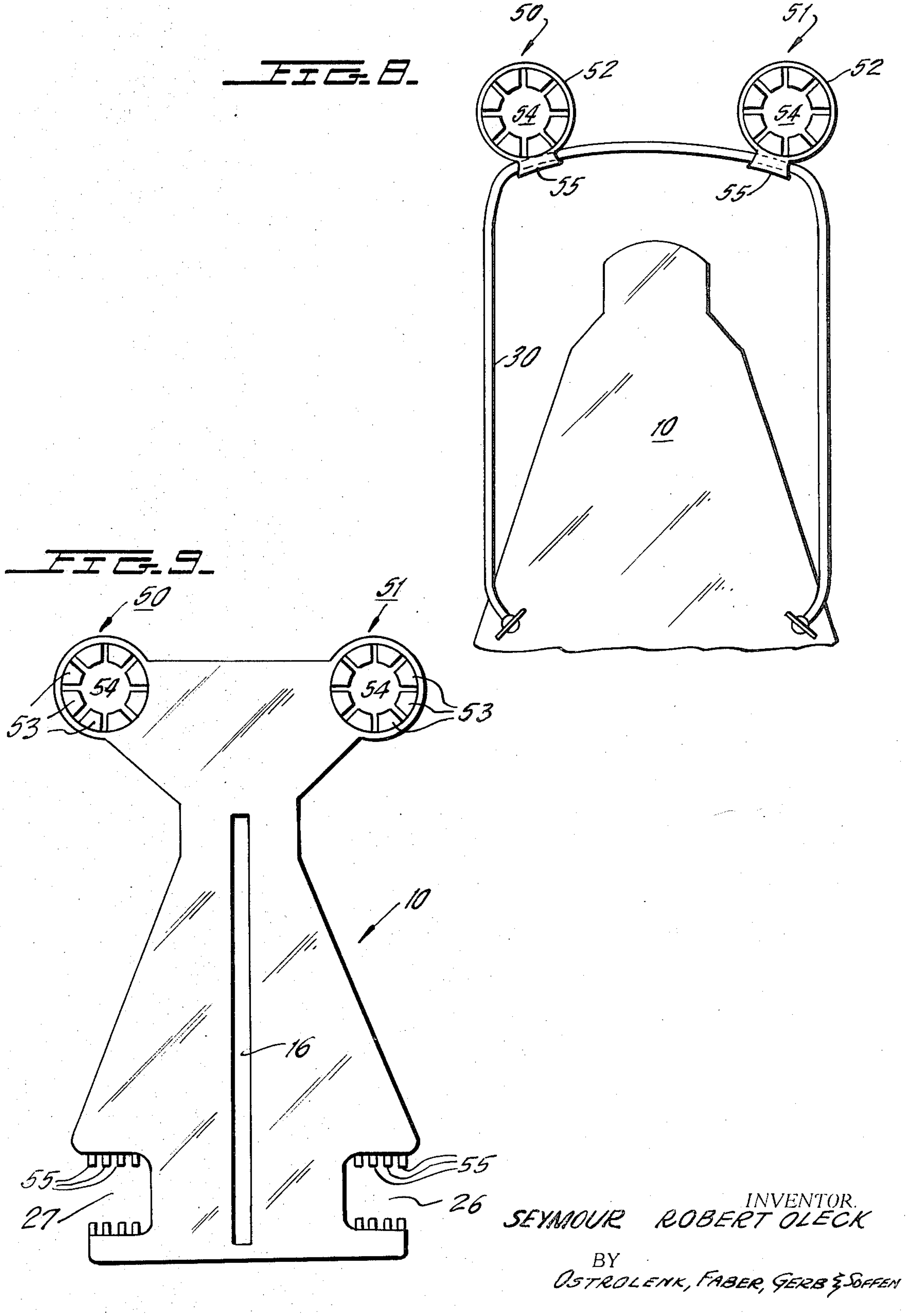
FIG. 8 is a top plan view of an alternative arrangement for that shown in FIG. 5.
FIG. 9 is a top plan view of an alternative frame member for that shown in FIG. 7.

FIG. 8 shows an alternative arrangement for the embodiment of FIG. 5 in which a pair of flexible springy leaf plastic members 50 and 51 are slidably mounted upon the elastic band 30. Each of the members are circular in shape and comprised of a plastic circular ring 52 having integrally formed inwardly projecting resilient leaf members 53 whose interior edges define a central opening 54. The circular plastic rings 52 have integrally formed therewith a hollow tubular shaped section 55 for receiving the elastic band 30. In application the forward indentations 26 and 27 of the frame member 10 (see FIG. 5) are positioned around the front feet 28 and 29 of the telephone handset while the flexible springy leaf assemblies 50 and 51 are force fitted upon the rear feet 32 and 31, respectively, of the telephone handset. The assembly is firmly maintained in position upon the telephone handset due to the stretching of elastic band 30.

Still another alternative embodiment is shown in FIG. 9 wherein the frame member 10 has integrally formed therewith the springy flexible leaf members 50 and 51 which are substantially the same as those shown in FIG. 8 with the exception of the fact that the hollow tubular members 55 are eliminated and thereby the elastic band is eliminated. In use the frame member is mounted upon the telephone handset so that the forward notches 26 and 27 embrace the front feet 28 and 29, respectively, while the rear assemblies 50 and 51 are force fitted upon the rear feet 32 and 31 of the telephone handset (see FIG. 5 for the designating numerals of the telephone handset). The width of notches 26 and 27 is sufficient to compensate for a spacing between the front and rear feet while the springy leaf members 53 provide adequate force fitting upon the telephone handset. If desired, similar springy leaf members 55 may be formed integrally within the notches 26 and 27 to provide a similar force fitting effect and thereby firmly mount the assembly to the telephone handset without the need for the elastic band.

In view of the foregoing description it can be seen that the present invention provides a new and novel indexed telephone directory particularly suitable for attachment to the underside of a telephone handset without interfering with the operation of the telephone and without permanently damaging the telephone. Furthermore, the telephone directory of the instant invention has been provided so as to be free from interference with its operation by the telephone and so as to be free from the problem of jamming and mutilation of the index cards. The index is substantially free of abrasion with parts which may easily be worn out such as the elastic cord and it is free of abrasion with the undersurface of the telephone.

While the present invention has been described with respect to the preferred embodiments thereof, many modifications and variations will now become apparent to those skilled in the art. It is therefore preferred that the scope of the invention not be limited by the disclosure herein but rather by the appended claims.

What is claimed is:

1. An indexed telephone directory for use with a telephone handset supported by a base having a plurality of spaced legs comprising:
   - a frame member having at least first and second indented portions on opposite sides thereof adjacent the forward end thereof; said first and second indented portions being spaced apart from each other and being of a size corresponding to the legs of the telephone handset whereby said indented portions may be placed over the front two legs of the telephone handset to support said frame member thereon;
   - elastic cord means;
   - said frame member having first and second holes therein for receiving the ends of said elastic cord and securing said elastic cord to said frame member; said elastic cord means being of a length such that with said indented portions of said frame member placed over the front two legs of the telephone handset the elastic cord means may be secured to the rear legs of the telephone handset and support said frame member on the legs of the telephone handset;
   - a tray having a plurality of index cards therein; said tray having a pair of prongs projecting from one end thereof passing through holes in the ends of said index cards;
   - said frame member having an elongated longitudinal slot for receiving said pair of prongs with said prongs overlapping the edges thereof to secure said tray to said frame member, a transverse slot in the front end of said frame member for receiving said tray and supporting its end opposite said prongs; and
   - a plurality of protrusions on said frame member substantially along the length of said longitudinal slot and of a height greater than the thickness of said pair of prongs for providing a minimum distance between said frame member and the underside of the telephone handset to prevent said prongs from engaging said telephone handset upon the movement of said tray.

2. An indexed telephone directory as set forth in claim 1 wherein said frame member includes a pair of projections on its underside spaced corresponding to the width of said tray for guiding said tray and index cards.

3. An indexed telephone directory as set forth in claim 2 wherein said index cards are of varying lengths.

4. An indexed telephone directory as set forth in claim 3 wherein said frame member includes an upwardly curved lip forming one edge of said transverse slot.

5. An indexed telephone directory for use with a telephone handset supported by a base having a plurality of spaced legs comprising:
   - a frame member having first, second, third and fourth mounting portions arranged near the four corners of said frame member; said first and second mounting portions being in opposite sides adjacent the forward end of said frame member and said third and fourth mounting portions being in opposite sides adjacent the rear end of said frame member; said mounting portions being spaced and of a size and shape corresponding to the configuration of the legs of the telephone handset with which said directory is to be used whereby said mounting portions may be placed upon the legs of said handset to embrace the handset legs and thereby support said frame member thereon;
   - a tray having a plurality of index cards therein; said tray having a pair of prongs projecting from one end thereof passing through holes in the ends of said index cards;
   - said frame member having an elongated longitudinal slot for receiving said pair of prongs with said prongs overlapping the edges thereof to secure said tray to said frame member; a transverse slot in the front end of said frame member for receiving said tray and supporting its end opposite said prongs; and
   - a plurality of protrusions on said frame member substantially along the length of said longitudinal slot and of a height greater than the thickness of said pair of prongs for providing a minimum distance between said frame member and the underside of the telephone handset to prevent said prongs from engaging said telephone handset upon the movement of said tray.

6. The directory of claim 5 wherein at least two of said mounting portions are provided with an opening; a plurality of leaf spring projections spaced about said openings and projecting inwardly toward the center of their associated openings to firmly embrace associated legs of said handset.

7. The directory of claim 5 wherein at least two of said mounting portions are provided with notches; a plurality of leaf spring projections spaced about opposite sides of each of said notches and projecting inwardly toward the center of their associated notches to firmly embrace associated legs of said handset.

8. The directory of claim 1 further comprising a pair of flat members each having a central opening; means provided on each of said flat members for slidably securing said flat member to said cord;
   - a plurality of leaf spring members arranged around each of said openings and projecting toward the center of their associated opening for embracing and firmly securing each of said flat members to an associated rear leg of said handset.

References Cited

UNITED STATES PATENTS

| | | | |
|---|---|---|---|
| 2,990,639 | 7/1961 | Van Gieson | 40—336 |
| 3,052,056 | 9/1962 | Eisenstein | 40—336X |
| 3,083,493 | 4/1963 | Malachuk | 40—336X |
| 3,243,908 | 4/1966 | Foley | 40—336 |

WILLIAM H. GRIEB, Primary Examiner